United States Patent [19]

Doyle

[11] Patent Number: 4,538,910

[45] Date of Patent: Sep. 3, 1985

[54] DUAL BEAM FOURIER SPECTROMETER

[75] Inventor: Walter M. Doyle, Laguna Beach, Calif.

[73] Assignee: Laser Precision Corporation, Utica, N.Y.

[21] Appl. No.: 431,346

[22] Filed: Sep. 30, 1982

[51] Int. Cl.³ .............................................. G01B 9/02
[52] U.S. Cl. .................................................. 356/346
[58] Field of Search ................. 356/346, 319; 350/172; 250/343

[56] References Cited

U.S. PATENT DOCUMENTS

| | | | |
|---|---|---|---|
| 4,165,938 | 8/1979 | Doyle | 356/346 |
| 4,183,669 | 1/1980 | Doyle | 356/346 |
| 4,190,366 | 2/1980 | Doyle | 356/346 |
| 4,265,540 | 5/1981 | Doyle | 356/346 |
| 4,395,775 | 7/1983 | Roberts et al. | 350/172 X |

FOREIGN PATENT DOCUMENTS 159123  12/1980  Japan .................... 356/346

Primary Examiner—Davis L. Willis
Assistant Examiner—Matthew W. Koren
Attorney, Agent, or Firm—Thomas J. Plante

[57] ABSTRACT

A dual beam Fourier-type spectrometer is disclosed in which the collimated output beam of a Michelson type interferometer is divided (post-interferometer) by a reflector which (a) reflects the bulk of said beam to the sample and thereafter a first detector, but (b) transmits part of said beam (preferably through apertures in the reflector) directly to a second detector. The relatively small portion of said beam which is transmitted to the second detector preferably passes through a substantial number of very small apertures in the reflector which are spaced in such a way as to maximize the spatial identity of the beams reaching the first and second detectors.

17 Claims, 2 Drawing Figures

DUAL BEAM FOURIER SPECTROMETER

BACKGROUND OF THE INVENTION

This invention relates to the field of spectroscopy, and particularly to spectrometers of the Fourier transform type. Such spectrometers generally incorporate a "division of amplitude" (Michelson) interferometer in which the source radiation is divided into two "arms" which are separately reflected and then recombined.

More specifically, the present invention is concerned with "dual beam" spectrometers having the same general purpose as those disclosed and claimed in Doyle U.S. Pat. No. 4,183,669 issued Jan. 15, 1980. As explained in that patent, the term "dual beam" refers to the fact that two distinct optical paths are used in the spectrometer, in order to "simultaneously obtain (a) data from a material sample under study and (b) data for reference purposes from a sample-free region".

As explained in U.S. Pat. No. 4,183,669 "the importance of dual beam Fourier spectroscopy stems from the fact that the interferogram corresponding to a broad radiation spectrum will have a very high peak value (central maximum) when the path lengths of the two interferometer arms are equal. In order to electronically perform the Fourier transformation required to obtain the spectrum, it is first necessary to digitize the interferogram, and the cost of analog-to-digital (A/D) converters rises rapidly with increased resolution. The resolution required of the input A/D converter will normally be much greater than that of the resulting spectrum".

Whereas the art prior to U.S. Pat. No. 4,183,669 disclosed a dual beam approach in which an "optical subtraction" method was used to reduce the central maximum of the interferogram, that patent disclosed a dual beam approach using an "electrical subtraction" method for producing a similar result.

Certain performance limitations have become apparent in the dual beam Fourier spectrometer of U.S. Pat. No. 4,183,669, which the present invention is intended to overcome. In the disclosure of that patent, separation between two optical beams is accomplished by allowing the beams to propagate at slightly different angles through the Michelson interferometer. When those beams are brought to a focus, they are spatially separated and hence can be directed along different optical paths to different detectors.

The foregoing arrangement has exhibited the following deficiencies:

(1) Because the two beams are propagated from slightly different areas of the infrared (IR) source, they may have slightly different spectral characteristics or may vary with time relative to each other; and (2) Since the beams propagate at different angles, they may experience slightly different optical path length variations as the interferometer is scanned. This will lead to incomplete cancellation of the two interferograms and to spurious artifacts in the differential spectrum. To avoid this problem, the beam directions have to be adjusted so as to make equal and opposite angles with the interferometer axis (i.e. scanning direction) so that the angular effects are the same. This adjustment may require very careful manipulation.

SUMMARY OF THE INVENTION

The present invention avoids the problems mentioned above by not relying on propagation angle to distinguish between the two optical beams. In other words, in the present optical system, the radiation which strikes each of the two detectors follows the same path, or at least parallel paths, in the interferometer. The sample and reference beams are thus derived from the same source area and are subject to the same path length change during scanning.

In the preferred embodiment of the invention, the output of the interferometer is split into two beams which arrive at two separate detectors after one of them passes through the sample area. This post-interferometer splitting of the radiation into two beams may be accomplished by using a reflector to intercept part of the essentially collimated interferometer output. This reflector may be a flat 100% mirror with one or more apertures to allow transmission of part of the beam. Since the mirror is placed in a collimated region, the transmitted and reflected beams will have followed parallel paths through the interferometer. Preferably a large number of small apertures are provided in the mirror, spaced in such a way as to maximize the spatial identity of the beams reaching the two detectors.

The present invention is particularly useful in situations where the sample beam is strongly attenuated, such as diffuse reflectance, micro-sampling, and infrared analysis of gas chromatography fractions.

DETAILED DESCRIPTION OF SPECIFIC EMBODIMENTS

In both of the illustrated versions of the present invention, the means for developing a dual beam output are in a post-interferometer location. In other words, the radiation, as it passes from the source through the interferometer, is not in the dual beam mode, except, of course, that the source radiation is divided by a beam splitter to create the two arms of the interferometer.

Figure 1:
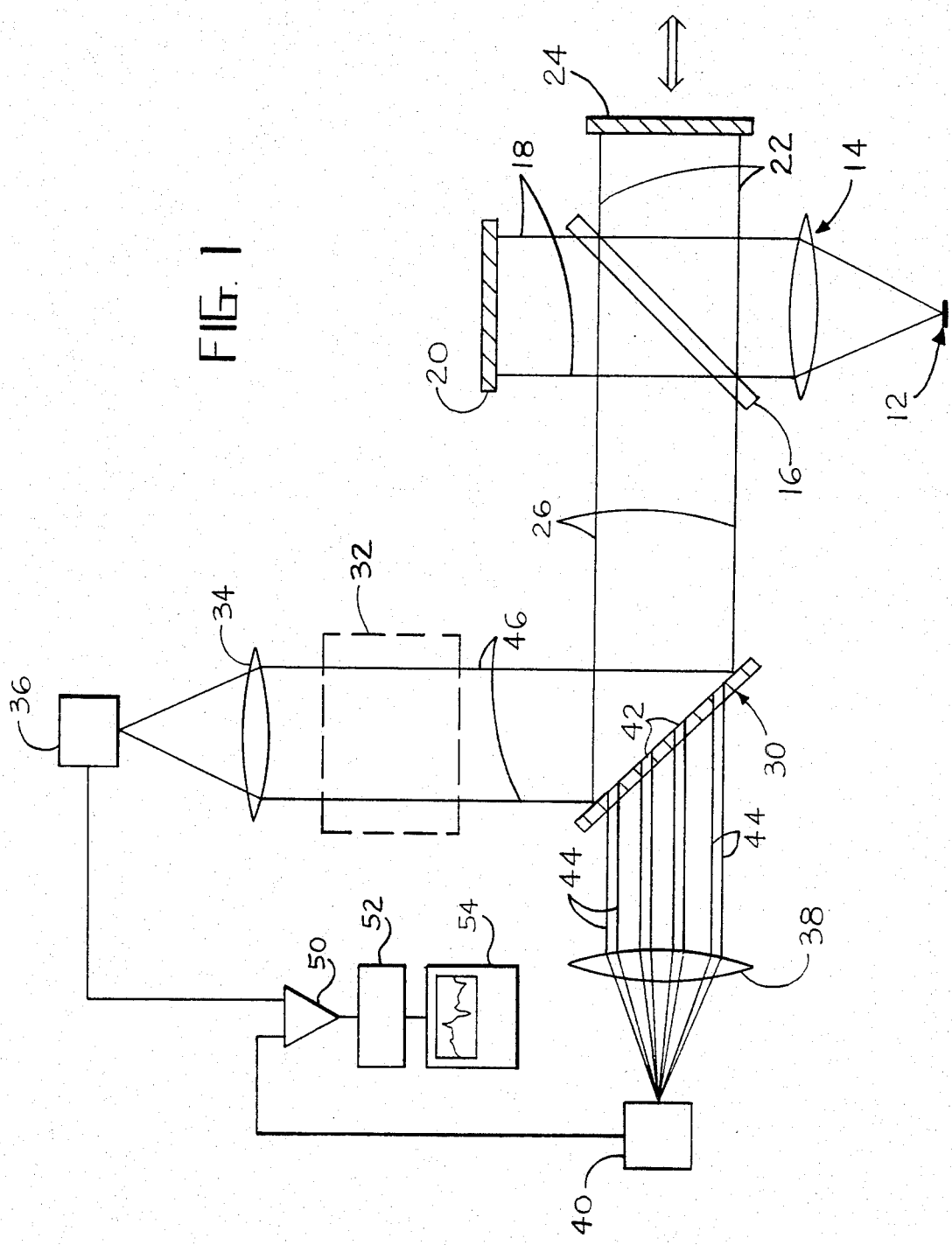
FIG. 1 is a schematic showing the present invention combined with an interferometer of the type in which scanning is accomplished by moving a mirror at the end of one of the interferometer arms.

In FIG. 1, a suitable radiation source 12 directs radiation through collimating optics 14 to a beam splitter 16, which (a) transmits, as beam 18, part of the radiation (preferably 50%) toward a fixed mirror 20 at the end of the fixed length arm; and (b) reflects, as beam 22, the remainder of the radiation (preferably 50%) toward movable mirror 24 at the end of the variable-length arm. Movement of mirror 24, as shown by the arrows, to lengthen or shorten the variable-length arm, causes spectral scanning by the interferometer. The radiation beam 18, which is reflected back by fixed mirror 20, and the radiation beam 22, which is reflected back by movable mirror 24, are recombined at the beam splitter 16. The output radiation beam 26 from the interferometer is in collimated form, having a circular cross-section as shown. This is, of course, the standard "Michelson" interferometer.

In order to obtain the dual beam effect, wherein two output beams are separately detected, one of which passes through a sample, and the other of which does not, a reflector 30 is used to intercept the output beam 26 and divide the radiation into two portions. One portion of the radiation is directed through a sampled area 32 and focusing optics 34 to a first detector 36. The other portion of the radiation is directed through focusing optics 38 to a second detector 40, which is preferably identical to the first detector 36.

The reflector 30 is preferably a flat 100% mirror having a plurality of apertures 42 which allow transmission of part of the collimated beam 26 to the second detector 40. Since the mirror 30 is placed in a collimated region, the transmitted, small diameter radiation beams 44, and the reflected, full diameter radiation beam 46, will have followed parallel paths through the interferometer. Therefore, no problems arise as a result of angular differences between the paths of the rays reaching the first and second detectors.

It is desirable to use a plurality of radiation transmitting apertures 42, rather than a single aperture, in order to maximize the spatial identity of the beams reaching the respective detectors 36 and 40. In other words, the beams 44 directed towards the second detector 40 are effectively dispersed throughout the cross-sectional area of the collimated beam 26, which is reflected as beam 46 toward detector 36.

Another possible arrangement would be the use of a partially transmitting beam splitter instead of mirror 30. However, this might introduce artifacts due to the polarization properties of reflection at non-normal incidence.

As shown, the reflector 30 is at an angle of 45° to the collimated beam 26, and each of the apertures 42 in reflector 30 is formed at an angle of 45° to the body of reflector 30, in order to provide straight-through transmission of radiation to lens 38 and detector 40. These angles could be varied if spatial characteristics of the interferometer dictated such variations. The area of the reflector 30 needs to be large enough to intersect the entire collimated beam 26, which is, as previously stated, circular in cross-section, but otherwise the shape of the surface area of the reflector 30 is not significant. It may, for example, be rectangular, round, or ellipsoidal.

There are certain practical limitations on the size of the apertures 42. If they are too small, there will be undesired diffraction effects. If they are too large, the radiation going to detector 40 may lack the desired uniformity with the sample area beam. In other words, both the size and the careful spacing of the apertures 42 is important in properly matching the signals which reach the detectors 36 and 40. For example, if we assume that the diameter of beam 26 is approximately 1 inch and that we want about 10% of the light to go to detector 40, each hole 30 could be approximately 1 mm (which is well above the wavelength of light), and the holes could be approximately 3 mm apart, resulting in 50–60 holes.

As a means of providing ready matching of the dual beam characteristics to different sample requirements, various other versions of mirror 30 could be available for substitution. For example, different mirrors having different aperture sizes or locations, or different thickness, could be easily inserted in the system in place of mirror 30, in order to change the radiation transmission to detector 40, thereby matching the signal attenuation in the sample. Another possible variation of mirror 30 would be the use of a "zero" thickness reflector made of a material such as mylar; such a pellicle reflector would permit simplified manufacture, and would create less of a vignetting effect. Yet another possible arrangement would be the addition of a movable plate on the back of mirror 30, having aligned apertures whose position could be adjusted by moving the plate, thereby changing the effective sizes of the apertures.

The outputs of the two detectors 36 and 40 are fed into a differential amplifier 50, the output of which is directed to a Fourier transform computer 52, from which spectral information may be supplied to a suitable display means 54.

In order to function properly, the outputs of the two detectors 36 and 40 need to be balanced by suitable initial adjustments of the two signals. This balancing requires an electronic amplitude adjustment and an optical phase-matching adjustment. The electronic amplitude balancing is accomplished by adjustment of the differential amplifier 50 to match the voltage levels from detectors 36 and 40, i.e., adjusting to zero, or null, with no sample in the system.

The optical phase matching adjustment requires that at least two independent optical adjustments be available, i.e., adjustments in the positions of optical elements. These should make it possible to adjust the optics so that the two detectors 36 and 40 view the source along paths which are parallel when passing through the interferometer. In other words, the sum of the rays reaching the two detectors should, on the average, originate from the same angles proceeding through the interferometer.

The fact that the dual beam structure is dealing with the collimated beam 26 makes optical adjustment relatively simple. While the concept disclosed in this application could be applied to a focused beam, it would be much harder to implement in a focused beam context than in a collimated beam context.

Figure 2:
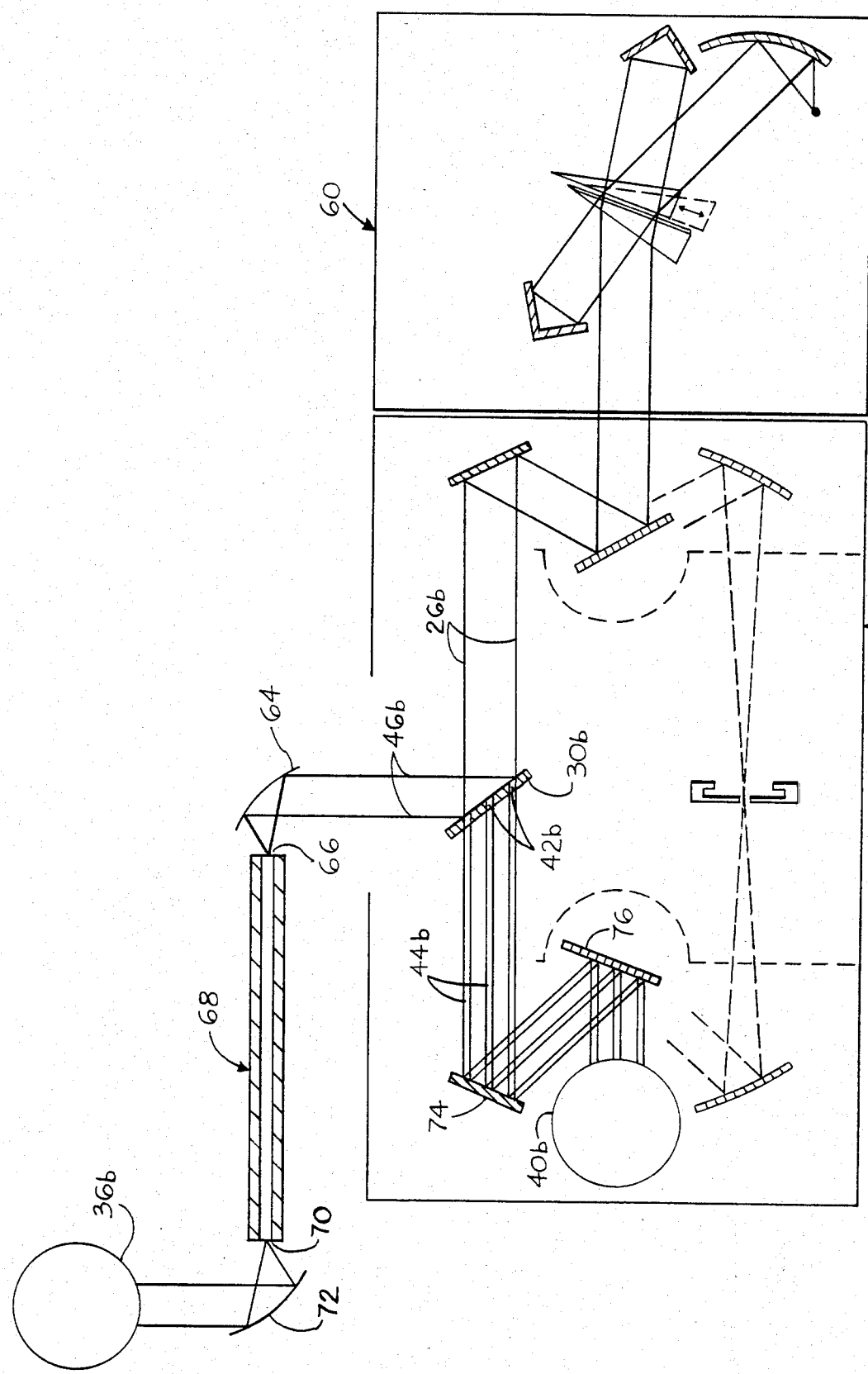
FIG. 2 is a schematic showing the present invention combined with an interferometer of the type in which scanning is accomplished by moving a wedge-shaped prism across one of the interferometer arms.

FIG. 2 shows the present invention combined with a "transept" interferometer, of the type disclosed in Doyle U.S. Pat. No. 4,265,540, issued May 5, 1981, and in Doyle application Ser. No. 291,402, filed Aug. 10, 1981. Additionally, FIG. 2 incorporates a light pipe as the sample-containing structure.

The transept interferometer, which is refractively scanned, is generally indicated by the numeral 60. A detailed description of the transept interferometer, and its sample region 62, is provided in application Ser. No. 291,402, which is incorporated by reference herein to make detailed description unnecessary.

The collimated output beam 26b is reflected by a flat mirror 30b, which has appropriately spaced radiation-transmitting apertures 42b, as previously described. The reflected beam 46b is directed to focusing optics 64, which focus the radiation at the end 66 of a light pipe 68. Radiation exiting at the other end 70 of the light pipe is received by collecting optics 72 and transmitted to detector 36b, which is preferably a cyrogenically cooled detector assembly for maximum effectiveness.

The spaced radiation beams 44b, which are transmitted through apertures 42b, are directed by reflectors 74 and 76 to detector 40b, which preferably is at the same cyrogenic temperature as detector 36b.

The system shown in FIG. 2 is intended as an on-line gas chomatography rapid-scanning interferometer (GC-IR). GC-IR is a field in which the present invention is particularly useful, because the sample beam is strongly attenuated. In some situations, the optical arrangement of the present invention has one disadvantage compared to a single beam system. In the present system, the two beams directed to the respective detectors are derived from a single interferometer beam, and hence must share its energy. This relative drawback is, however, particularly insignificant in those situations where the sample beam is strongly attenuated, such as diffuse reflectance, micro-sampling, and GC-IR. For such applications, an FT-IR instrument is often operated with a high sensitivity cooled detector, such as HgCdTe. Even if only 10% of the signal reaches the detector, the signal-to-noise ratio of the detector interferogram output will be considerably in excess of the dynamic range capability of the analog-to-digital converter and FFT computer. Thus, the dual beam approach is appropriate. However, only a small percentage (e.g., 10%) of the interferogram signal needs to be diverted to the second detector (40 or 40b) to achieve a balanced condition. The majority of the signal (e.g., 90%) is still available for sample analysis.

The gas cell in FIG. 2 (not showing the gas inlet and outlet) is the light pipe 68, which is preferably internally gold-coated and which has appropriate volume and path length measurements, e.g., 40 cm long ×2.6 mm inner diameter. The radiation transmission through such a gas cell will normally be in the range of 10% to 20% of the incoming energy from beam 26b. Therefore, a relatively small amount of radiation transmitted through the apertures in reflector 30b will suffice to provide balanced energy inputs at detectors 40b and 36b.

From the foregoing description, it will be apparent that the apparatus disclosed in this application will provide the significant functional benefits summrized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. A dual beam spectrometer comprising:
   a radiation source propagating its beam from a single location;
   an interferometer which receives the beam and which outputs a spectrally-scanned beam;
   a beam interceptor which receives the output beam from the interferometer and divides its energy into two components;
   a first detector adapted to receive one such energy component after it has illuminated a sample and convert it into an electronic signal;
   a second detector adapted to receive the other such energy component without attenuation by a sample and convert it into an electronic signal; and
   means for co-adding the signals generated by the two detectors to provide an electronic spectrometer output.

2. The dual beam spectrometer of claim 1, wherein the beam interceptor is a reflector which generally redirects the beam from the interferometer toward the sample and the first detector, but which transmits part of the beam to the second detector.

3. The dual beam spectrometer of claim 2 wherein: the interferometer output beam is collimated; and the beam interceptor is a flat mirror which is mounted at an angle with respect to said beam so as to redirect the beam toward the first detector, but which has apertures therethrough to transmit part of the beam to the second detector.

4. The dual beam spectrometer of claim 3 wherein the interceptor reflector has a plurality of apertures located in balanced positions throughout the cross-sectional area of the beam, thereby providing maximum spatial identity of the radiation directed toward the two detectors.

5. The dual beam spectrometer of claim 3 wherein the apertures in the mirror each have a diameter much larger than the wavelengths of the interferometer radiation.

6. The dual beam spectrometer of claim 1 wherein:
   the energy component which illuminates the sample is several times larger than the other energy component; and
   the sample is gas contained in a light pipe.

7. The dual beam spectrometer of claim 1 which also comprises:
   means for initially balancing the electronic amplitude of the first and second detectors with no sample in the spectrometer; and
   means for initially providing optical adjustment so that the sum of the rays reaching the first and second detectors originate from the same angles proceeding through the interferometer.

8. In a spectrometer which includes a beam splitter interferometer providing two radiation "arms" which are recombined and exit from the interferometer as a collimated beam, a dual beam optical system for comparing sample-illuminating radiation with non-sample-illuminating radiation, comprising:
   a beam interceptor which receives the collimated exit beam from the interferometer and divides its energy into two components;
   a first detector adapted to receive one such energy component after it has illuminated a sample and convert it into an electronic signal;
   a second detector adapted to receive the other such energy component without attenuation by a sample and convert it into an electronic signal; and
   means for co-adding the signals generated by the two detectors to provide an electronic spectrometer output.

9. The dual beam optical system of claim 8, wherein the beam interceptor is a reflector which generally redirects the beam from the interferometer toward the sample and the first detector, but which transmits part of the beam to the second detector.

10. The dual beam optical system of claim 9 wherein:
    the interferometer output beam is collimated; and
    the beam interceptor is a flat mirror which is mounted at an angle with respect to said beam so as to redirect the beam toward the first detector, but which has apertures therethrough to transmit part of the beam to the second detector.

11. The dual beam optical system of claim 10 wherein the interceptor reflector has a plurality of apertures located in balanced positions throughout the cross-sectional area of the beam, thereby providing maximum spatial identity of the radiation directed toward the two detectors.

12. The dual beam optical system of claim 11 which also comprises:
    means for initially balancing the electronic amplitude of the first and second detectors with no sample in the spectrometer; and
    means for initially providing optical adjustment so that the sum of the rays reaching the first and second detectors originate from the same angles proceeding through the interferometer.

13. The dual beam spectrometer of claim 10 wherein the apertures in the mirror each have a diameter much larger than the wavelengths of the interferometer radiation.

14. For use in a spectrometer which includes a beam splitter interferometer providing two radiation "arms" which are recombined and exit from the interferometer as a collimated beam, a method of analyzing the collimated exit beam from the interferometer comprising the following steps:
dividing said collimated exit beam into two portions, one of which has much larger radiation energy than the other;
causing the relatively large energy portion of divided radiation to illuminate the sample;
causing the post-sample radiation to be measured by a first photodetector;
causing the relatively small energy portion of divided radiation to be measured by a second photodetector without illuminating the sample; and
combining the electrical signals output by the first and second photodetectors.

15. The method of claim 14 wherein the step of dividing the collimated exit beam from the interferometer comprises:
causing the relatively high energy radiation directed to the sample to be a collimated beam having essentially the same diameter as the collimated exit beam; and
causing the relatively low energy radiation directed to the second photodetector to be a plurality of very small beams which provide a multiplicity of substantially spatially balanced samples taken from the collimated exit beam.

16. The method of claim 15 wherein the very small beams each have a diameter much larger than the wavelengths of the interferometer radiation.

17. The method of claim 15 which also comprises:
initially balancing the electronic amplitude of the first and second detectors with no sample in the spectrometer; and
initially providing optical adjustment so that the sum of the rays reaching the first and second detectors originate from the same angles proceeding through the interferometer.

* * * * *